US012783374B2

(12) United States Patent
Sathiya et al.

(10) Patent No.: US 12,783,374 B2
(45) Date of Patent: Nov. 3, 2026

(54) AUTOMATED CLOUD COMPUTING RESOURCE TESTING BASED ON COMPATIBILITY GRAPH OPTIMIZATION

(71) Applicant: Microsoft Technology Licensing, LLC, Redmond, WA (US)

(72) Inventors: Akshay Sathiya, Olympia, WA (US); Rohit Pandey, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 114 days.

(21) Appl. No.: 18/816,331

(22) Filed: Aug. 27, 2024

(65) Prior Publication Data

US 2026/0064549 A1 Mar. 5, 2026

(51) Int. Cl.
*G06F 11/26* (2006.01)
*G06F 11/3668* (2025.01)

(52) U.S. Cl.
CPC .......... *G06F 11/26* (2013.01); *G06F 11/3684* (2013.01); *G06F 11/3688* (2013.01)

(58) Field of Classification Search
CPC . G06G 11/26; G06G 11/3676; G06G 11/3684
See application file for complete search history.

(56) References Cited

U.S. PATENT DOCUMENTS

| | | | | |
|---|---|---|---|---|
| 10,698,806 B1 * | 6/2020 | Scholz | G06F 11/3688 | |
| 10,931,532 B2 * | 2/2021 | Navare | H04L 43/0817 | |
| 11,848,872 B2 * | 12/2023 | Gladney | G06F 16/903 | |
| 2002/0100022 A1 * | 7/2002 | Holzmann | G06F 11/3608 | 717/126 |
| 2004/0088677 A1 | 5/2004 | Williams | | |
| 2006/0010448 A1 | 1/2006 | Sathe | | |
| 2006/0179383 A1 * | 8/2006 | Blass | G06F 11/263 | 714/738 |
| 2009/0222697 A1 | 9/2009 | Thakkar et al. | | |
| 2014/0222480 A1 | 8/2014 | Reich et al. | | |
| 2016/0019135 A1 * | 1/2016 | Gotlieb | G06N 5/01 | 717/124 |

(Continued)

FOREIGN PATENT DOCUMENTS

| | | |
|---|---|---|
| CN | 107528742 A | 12/2017 |
| CN | 114968491 A | 8/2022 |

OTHER PUBLICATIONS

"Advancing Cloud Platform Operations and Reliability with Optimization Algorithms", Retrieved From: https://azure.microsoft.com/en-us/blog/advancing-cloud-platform-operations-and-reliability-with-optimization-algorithms/, Aug. 29, 2024, 7 Pages.

(Continued)

*Primary Examiner* — Joseph O Schell

(57) ABSTRACT

A method, computer program product, and computing system for processing a plurality of compatibility constraints for a cloud computing environment. A plurality of prevalence metrics for the cloud computing environment are processed. A graph structure mapping compatibility relationships between cloud computing resources is generated based upon, at least in part, the plurality of compatibility constraints. A constrained optimization process is defined for the graph structure. A testing schedule for the cloud computing resources is generated using the graph structure and the constrained optimization process.

17 Claims, 8 Drawing Sheets

(56) References Cited

U.S. PATENT DOCUMENTS

| | | | | |
|---|---|---|---|---|
| 2017/0201427 | A1* | 7/2017 | Savio | G06F 11/26 |
| 2018/0121822 | A1* | 5/2018 | Aghasaryan | G06F 11/079 |
| 2019/0213115 | A1* | 7/2019 | Takawale | G06F 11/3692 |
| 2021/0365357 | A1* | 11/2021 | Gamliel | G06F 11/3684 |
| 2022/0138081 | A1* | 5/2022 | Varma | G06F 11/3684 717/124 |
| 2023/0059703 | A1* | 2/2023 | Huang | G06F 11/3676 |
| 2023/0176916 | A1* | 6/2023 | Narayanam | G06F 11/301 718/104 |
| 2023/0251960 | A1* | 8/2023 | Sharma | G06N 5/04 717/124 |

OTHER PUBLICATIONS

"Safe Deployment Practices (SDP) for Production Deployments", Retrieved From: https://eng.ms/docs/quality/zero-self-inflicted-sev1s/safedeploymentpractices_overview, Retrieved on Jul. 2, 2025, 15 pages.

Ahmed, et al., "Handling constraints in combinatorial interaction testing in the presence of multi objective particle swarm and multithreading", Information and Software Technology, vol. 86, 2017, pp. 20-36.

Conte, "Review of the Bron-Kerbosch algorithm and variations", in School of Computing Science, May 5, 2013, 9 pages.

Gargantini, et al., "Efficient Combinatorial Test Generation Based on Multivalued Decision Diagrams", In Haifa Verification Conference, vol. 8855, Nov. 2014, 16 pages.

Pandey, "Using Graph Theory to Design Experiments", accessed on link https://experiencestack.co/using-graph-theory-to-design-experiments-145f24875281, Feb. 22, 2022, 10 pages.

Sathiya, et al., "Optimizn: a Python Library for Developing Customized Optimization Algorithms", In Repository of arXiv:2503.00033v1, Feb. 25, 2025, 10 pages.

Extended European search report received in European Application No. 25194556.4, mailed on Feb. 27, 2026, 10 pages.

* cited by examiner

AUTOMATED CLOUD COMPUTING RESOURCE TESTING BASED ON COMPATIBILITY GRAPH OPTIMIZATION

BACKGROUND

The reliability of cloud platforms and cloud computing environments depends heavily on the performance of their internal programs (i.e., agents of the cloud computing environment). To address regressions in cloud computing environments, the design of pre-production agent-testing environments must take into account the diversity of server/node properties (hardware model, virtual machine type, etc.) across a fleet of cloud computing devices and dynamically emphasize or de-emphasize the prevalence of certain node properties based on current testing priorities.

In production, these agents need to run on several environments with different configurations of server/node properties. Accordingly, agents are tested to ensure that they will perform as expected in production and keep the cloud computing environment reliable for its users.

BRIEF DESCRIPTION OF THE DRAWINGS

Like reference symbols in the various drawings indicate like elements.

DETAILED DESCRIPTION

Figure 1:
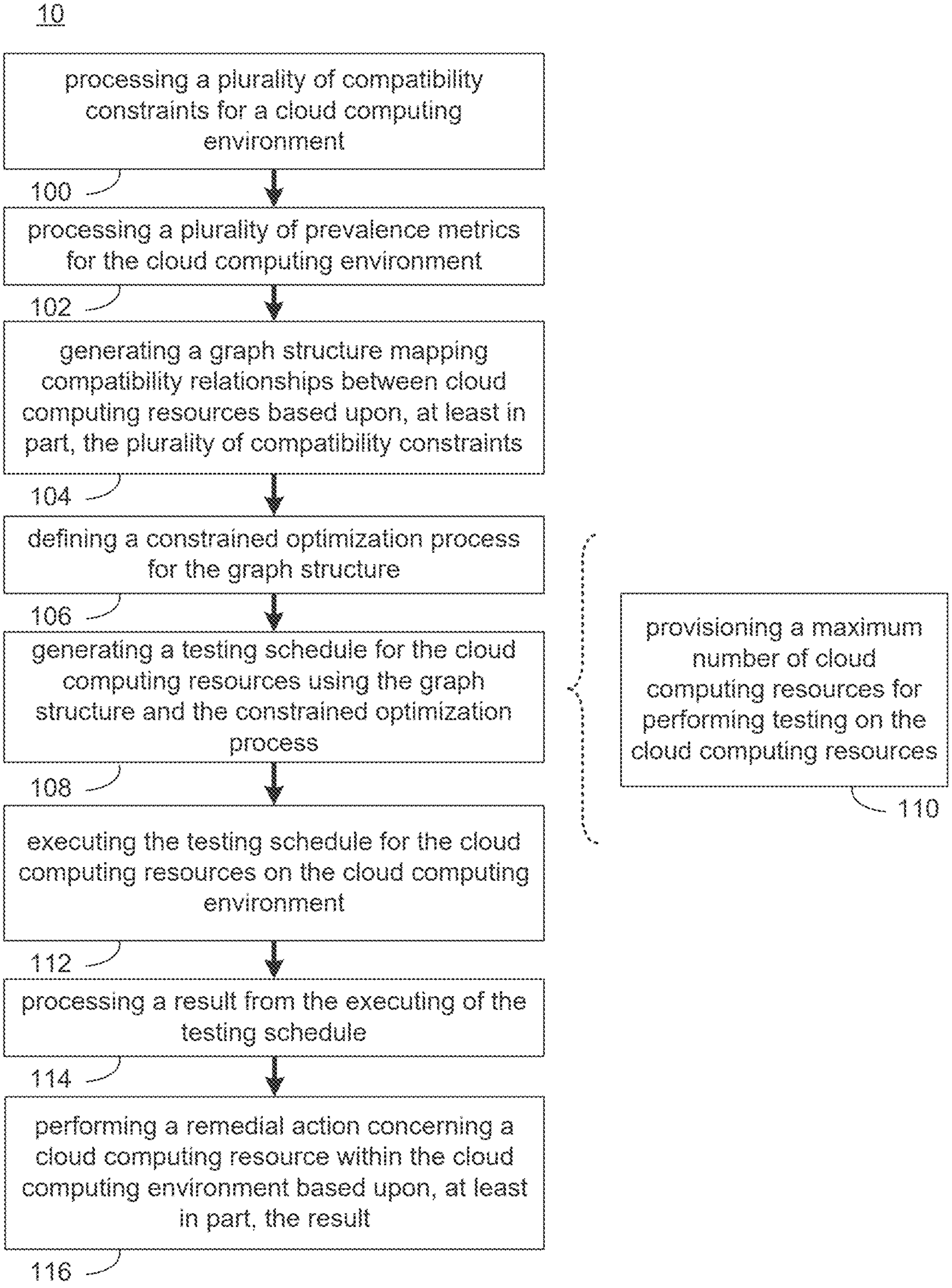
FIG. 1 is a flow chart of one implementation of an automated cloud computing resource testing process.

Implementations of the present disclosure provide a process for optimizing combinatorial testing (e.g., pre-production agent build testing and/or cloud computing resource testing (i.e., hardware resources, virtual resources, and/or operating system resources)) for cloud computing resources within a cloud computing environment. For example, the automated cloud computing resource testing process can be likened unto an environment design problem with multiple dimensions defined by cloud computing resources/properties (e.g., hardware resources (e.g., hardware model), virtual resources (e.g., virtual machine type), operating system resources (e.g., operating system image)) with compatibility relationships that constrain the ability to test various compatible configurations of these cloud computing resources. A testing schedule is defined by identifying an optimized list of node configurations (i.e., configurations of cloud computing resources to test on a testing computing device). Conventional approaches use decision variables (i.e., variables that are controlled to achieve a near-optimal (if not optimal) testing schedule). However, to map all of the possible testing node configurations to a respective decision variable, each testing node configuration is enumerated and stored in memory. Optimization algorithms processing each testing node configuration risk causing out-of-memory errors and waste significant processing time to enumerate each testing node configuration rather than exploring other potentially better schedules.

As will be discussed in greater detail below, implementations of the present disclosure produce a schedule for automated testing of cloud computing resources that account for compatibility constraints and prevalence metrics associated with the cloud computing resources and/or the cloud computing environment. For example, as opposed to using decision variables, the automated cloud computing resource testing process generates a testing schedule as a list of configurations of cloud computing resources in a graph structure formed from compatibility constraints, where each element in the list is a clique (i.e., nodes in a graph structure where every two distinct nodes are connected by an edge).

A constrained optimization process is defined and/or performed for optimizing the list of cliques from the graph structure by producing cliques as needed instead of generating all cliques at once at the start, and by iteratively modifying and/or replacing a respective clique from the list of cliques (i.e., during simulated annealing optimization) or by iteratively and/or recursively adding cliques to a partially assembled list of cliques (i.e., during branch and bound optimization) until a solution is obtained (i.e., a testing schedule for the cloud computing resources) that provides an efficient testing methodology given compatibility constraints (i.e., mandatory constraints) and prevalence metrics (i.e., non-mandatory metrics) associated with the cloud computing environment. The testing schedule is optimized such that the prevalence of particular properties, pairs of properties, and/or combinations of properties are modified to obtain or nearly obtain the prevalence metrics.

Accordingly, the automated cloud computing resource testing process avoids the risk of encountering out-of-memory errors and explores diverse testing schedules earlier in the processing. For example, the automated cloud computing resource testing process performs continuous training where an initial schedule is determined and/or optimized, and/or the state of the graph structure and the state or progress of the constrained optimization (i.e., simulated annealing optimization and branch and bound optimization) are retained for subsequent use. For instance, if the prevalence metrics and compatibility constraints are unchanged, the retained graph structure and/or the state or progress of constrained optimization are used for generating the testing schedule without retraining (i.e., regenerating the graph structure and/or restarting the constrained optimization). In this manner, the automated cloud computing resource testing process reduces the time required to generate a testing schedule and avoids overconsumption of limited memory resources within a cloud computing environment when testing agents. For example, the automated cloud computing resource testing process can be performed in disjoint intervals to utilize compute time and resources more efficiently.

The details of one or more implementations are set forth in the accompanying drawings and the description below. Other features and advantages will become apparent from the description, the drawings, and the claims.

The Automated Cloud Computing Resource Testing Process:

Referring to FIGS. 1-7, automated cloud computing resource testing process 10 processes 100 a plurality of compatibility constraints for a cloud computing environment. A plurality of prevalence metrics for the cloud computing environment are processed 102. A graph structure, mapping compatibility relationships between cloud computing resources, is generated 104 based upon, at least in part, the plurality of compatibility constraints. A constrained optimization process is defined 106 for the graph structure. A testing schedule for the cloud computing resources is generated 108 using the graph structure and the constrained optimization process.

Figure 2:
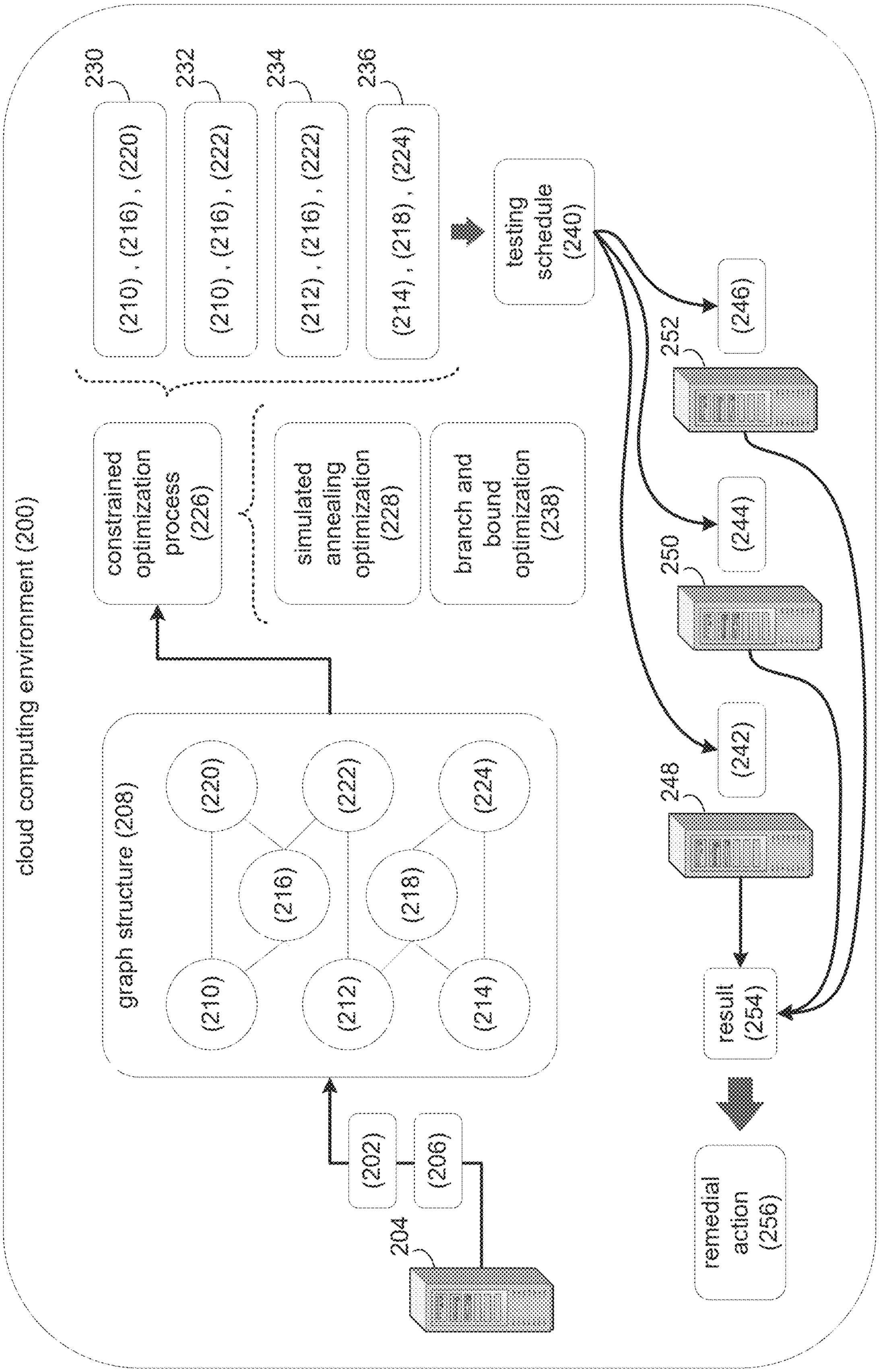
FIG. 2 is diagrammatic view of the automated cloud computing resource testing process.

In some implementations, automated cloud computing resource testing process 10 processes 100 a plurality of compatibility constraints for a cloud computing environment. For example, a compatibility constraint is a rule or other defined limitation that prescribes how cloud computing resources within a cloud computing environment can or cannot interact or communicate. Referring also to FIG. 2, a cloud computing environment (e.g., cloud computing environment 200) is a virtual infrastructure that allows users to access and utilize cloud computing resources such as servers, storage, databases, networking, software, and analytics over the internet, commonly referred to as "the cloud." These resources are hosted on remote servers and managed by cloud service providers (CSPs). Key characteristics of a cloud computing environment include on-demand self-service, where users can provision and manage computing resources as needed without requiring human intervention from the service provider, and broad network access, which ensures resources are accessible over the internet from various devices, including laptops, smartphones, and tablets. In some implementations, compatibility constraints include constraints that indicate when cloud computing resources are compatible and/or when cloud computing resources are incompatible.

As discussed above, agents (i.e., software programs or systems) are deployed within cloud computing environment 200 to manage the operation of cloud computing resources to accomplish various tasks. Agents perform various functions such as resource management, monitoring and logging, automation processes, security, data management, and load balancing across cloud computing servers. As these agents can involve various cloud computing resources, testing is performed on combinations of cloud computing resources. However, with limitations in compatible cloud computing resources, testing agents is constrained to compatible configurations of cloud computing resources.

In some implementations, the plurality of cloud computing resources include one or more of: hardware resources; virtual machine resources; and operating system resources. For example, cloud computing resources generally include the hardware, software, and/or virtual components of a cloud computing environment that communicate with one another to perform various data processing and/or data storage tasks. In some implementations, the plurality of compatibility constraints concern the compatibility between hardware resources, virtual machine resources, and/or operating system resources within the cloud computing environment. For example, not all cloud computing resources (or versions of a cloud computing resource) are compatible with one another, where compatibility generally defines interoperability between the communication protocols and processes of a pair of cloud computing resources. As such and in some implementations, compatibility constraints define the compatibility between hardware resources, virtual machine resources, and/or operating system resources to ensure that only compatible cloud computing resource combinations are tested.

In some implementations and as shown in FIG. 2, automated cloud computing resource testing process 10 processes 100 a plurality of compatibility constraints (e.g., compatibility constraints 202) for cloud computing environment 200. In one example, automated cloud computing resource testing process 10 receives compatibility constraints 202 from a user and/or a server (e.g., server 204) configured to store and access compatibility constraints 202. In some implementations, compatibility constraints 202 are computer-readable rule sets describing compatibility between hardware resources, virtual machine resources, and/or operating system resources. In one example, compatibility constraints 202 define which hardware resources are compatible with particular virtual machine resources; which virtual machine resources are compatible with particular hardware resources; which operating system resources (or versions of operating system resources) are compatible with particular hardware resources; which virtual machines are compatible with particular operating system resources (or versions of operating systems); and which hardware resources are compatible with particular operating system resources. While examples of hardware resources, virtual machine resources, and operating system resources have been described, it will be appreciated that compatibility constraints 202 include any combination of various cloud computing resources within the scope of the present disclosure.

In some implementations, automated cloud computing resource testing process 10 processes 102 a plurality of prevalence metrics for the cloud computing environment. For example, a prevalence metric is a non-mandatory goal that describes an ideal configuration of cloud computing resources within cloud computing environment 200. In one example, a prevalence metric defines a distribution of scores, ranks, percentages, and/or priority levels for cloud computing resources (e.g., a percentage of hardware resources (e.g., servers) from a particular hardware model manufacturer or of a specific performance type (e.g., hard disk drive (HDD) storage versus solid-state drive (SSD) storage); a percentage of virtual machines from a particular virtual machine provider; a range of desired versions of an operating system; etc.). In some implementations, prevalence metrics are, unlike compatibility constraints, flexible. As such and as will be discussed in greater detail below, automated cloud computing resource testing process 10 optimizes the testing schedule to accommodate prevalence metrics by adjusting the particular cloud computing resource configurations included in the testing schedule.

Referring again to FIG. 2, automated cloud computing resource testing process 10 processes 102 a plurality of prevalence metrics (e.g., prevalence metrics 206) for cloud computing environment 200. In one example, automated cloud computing resource testing process 10 receives prevalence metrics 206 from a user and/or a server (e.g., server 204) configured to store and access prevalence metrics 206. In some implementations, prevalence metrics 206 are computer-readable rule sets describing ideal cloud computing resource configurations for cloud computing environment 200. As such, automated cloud computing resource testing process 10 attempts to achieve prevalence metrics 206 but is not categorically limited by them (as with compatibility constraints 202).

In some implementations, automated cloud computing resource testing process 10 generates 104 a graph structure mapping compatibility relationships between cloud computing resources based upon, at least in part, the plurality of compatibility constraints. A graph structure is a collection of nodes and edges where each node belongs to a dimension representing a cloud computing resource type (e.g., hardware resource types, virtual machine resource types, and/or operating system resource types) and each node has one or more dimension value representing one or more specific cloud computing resources within a given dimension (e.g., hardware resources, virtual machine resources, and/or operating system resources). Referring also to FIG. 2, automated cloud computing resource testing process 10 generates 104 graph structure 208 with a set of nodes (e.g., nodes 210, 212, 214 representing particular hardware resources; nodes 216, 218 representing specific virtual machine resources; and nodes 220, 222, 224 representing particular operating system resources). Automated cloud computing resource testing process 10 generates 104 graph structure 208 with edges using plurality of compatibility constraints 202. For example, automated cloud computing resource testing process 10 defines edges between nodes 210, 216 indicating compatibility between respective cloud computing resources (i.e., compatibility between hardware resource 210 and virtual machine resource 216). Accordingly, the absence of edges in graph structure 208 indicates a lack of compatibility between respective nodes. In another example, "negative" edges in graph structure 208 represent incompatibility between respective nodes. While examples are shown of edges between pairs of nodes, it will be appreciated that edges may represent compatibility across any number of nodes within graph structure 208.

Figure 3:
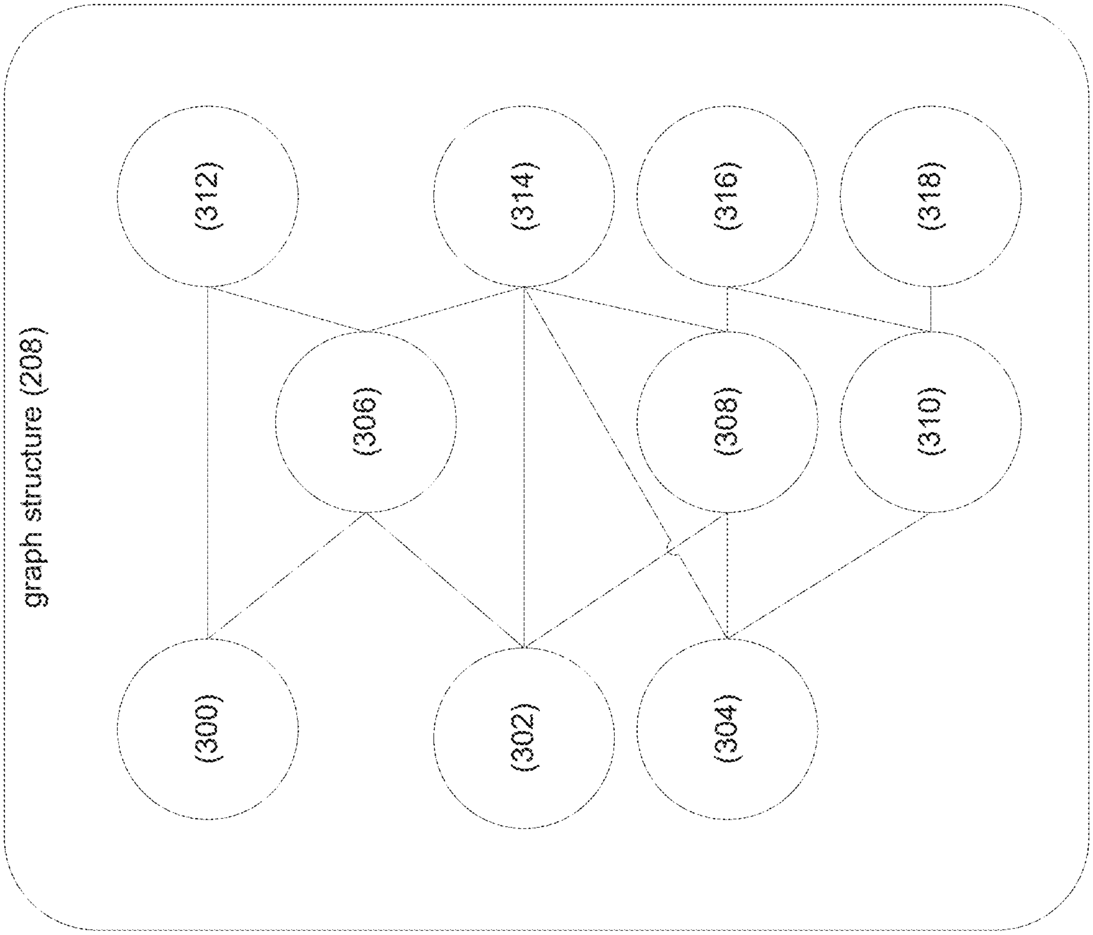
FIGS. 3-5 are diagrammatic views of graph structure generated by automated cloud computing resource testing process.

In some implementations, generating 104 graph structure 208 includes reducing graph structure by excluding nodes and edges that are listed in an exclude scope and by including nodes and edges that are listed in an include scope defined for graph structure 208. For example, automated cloud computing resource testing process 10 reduces the size of graph structure 208 by removing nodes that cannot be covered in a clique (e.g., when the node cannot be covered by a clique having a size equal to the number of dimensions of graph structure 208). For example and referring also to FIGS. 3-5, automated cloud computing resource testing process 10 removes nodes from graph structure 208 by first (as shown in FIG. 3) removing nodes that do not share an edge with at least one node in an include scope (i.e., predefined characteristics of nodes and edges within graph structure 208). In this example assume that nodes 300, 302, 304, 306, 308, 310, 312, 314, 316, 318 are coupled using various edges (i.e., an edge between nodes 300, 312; an edge between nodes 300, 306; an edge between nodes 302, 306; an edge between nodes 302, 314; an edge between nodes 302, 308; an edge between nodes 304, 308; an edge between nodes 304, 310; an edge between nodes 306, 312; an edge between nodes 306, 314; an edge between nodes 308, 314; an edge between nodes 308, 316; an edge between nodes 310, 316; and an edge between nodes 310, 318). In this example, suppose the include scope includes nodes 300, 302, 304. Accordingly, nodes that do not share an edge with any of nodes 300, 302, 304 are removed (i.e., nodes 316, 318).

Figure 4:
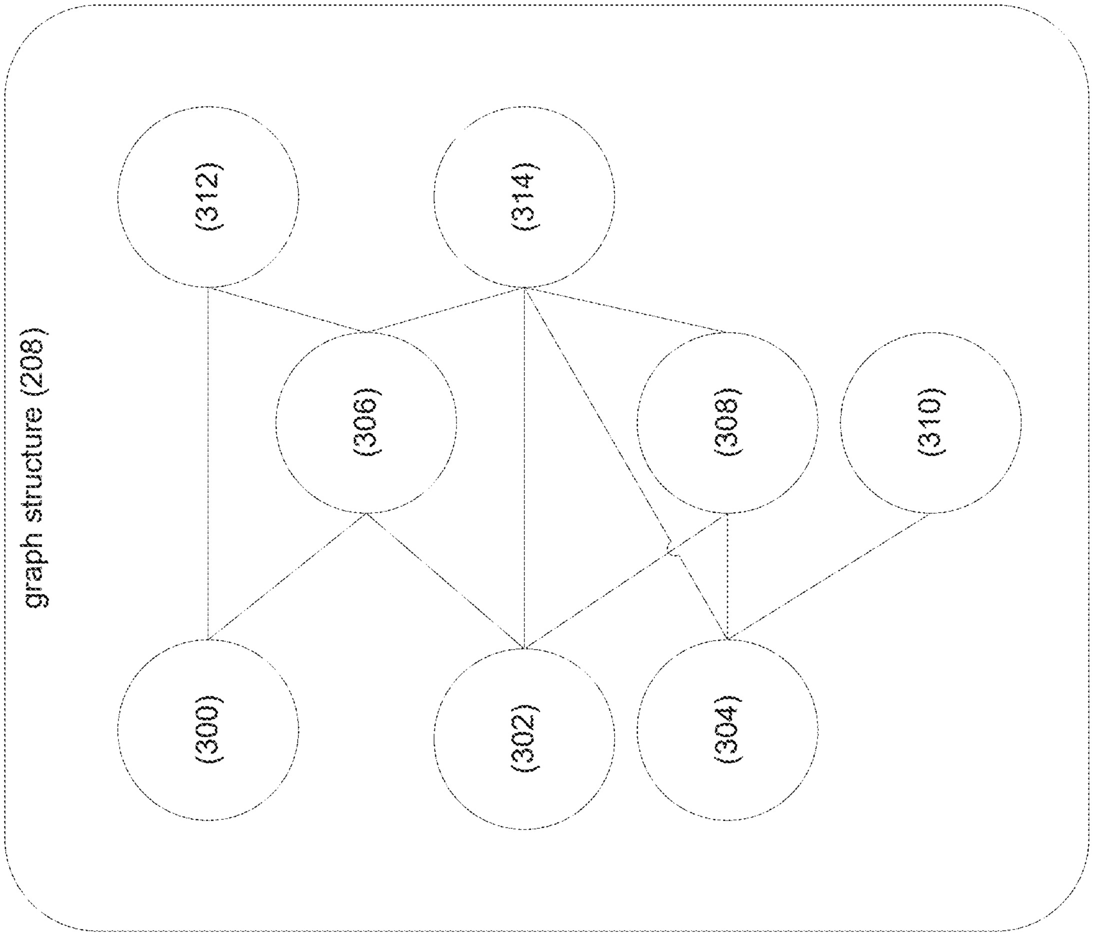
Figure 5:
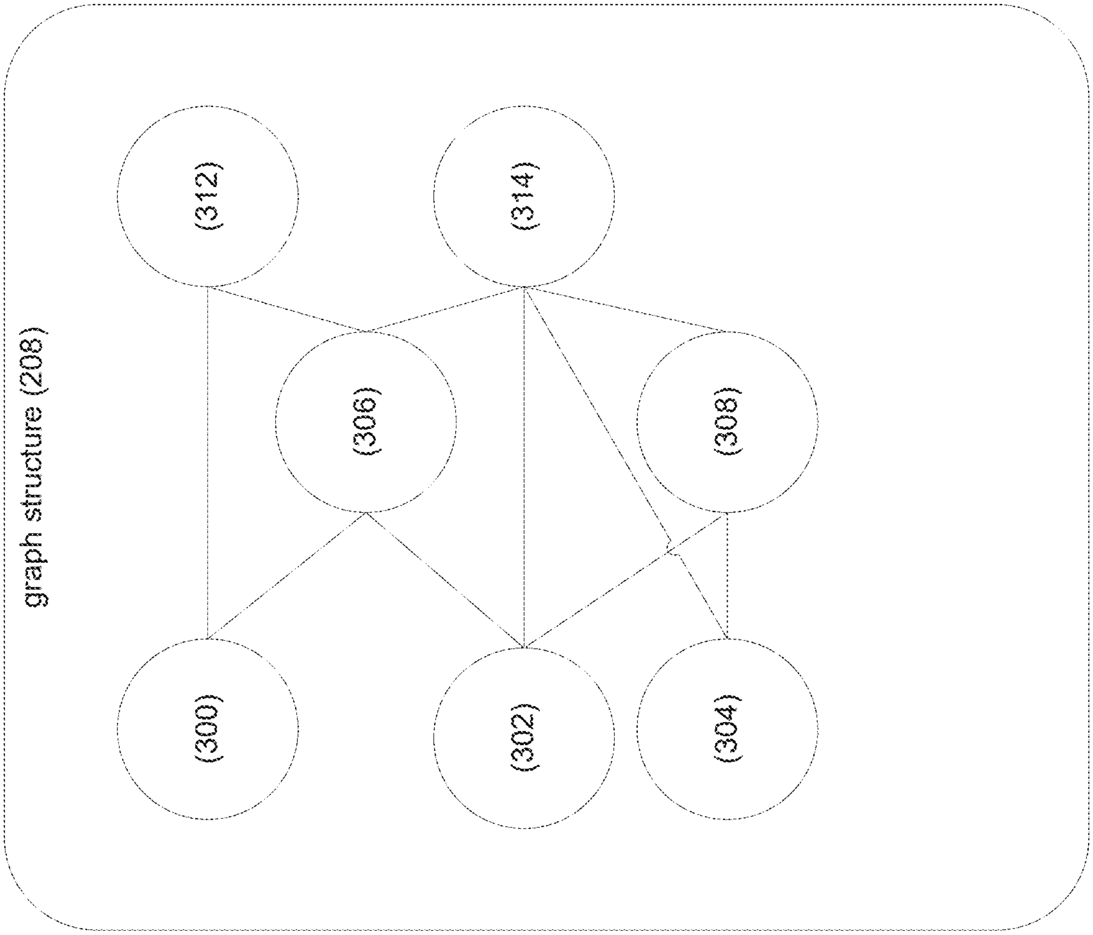

Referring also to FIG. 4, automated cloud computing resource testing process 10 removes nodes that do not share an edge with at least one node from each of the other dimensions. In this example, automated cloud computing resource testing process 10 removes node 310 that does not share an edge with a node from the operating system resource dimension. Accordingly, automated cloud computing resource testing process 10 removes node 310. Referring also to FIG. 5, automated cloud computing resource testing process 10 repeats the removal of nodes until all nodes have an edge with at least one node from each of the other dimensions. In this example, automated cloud computing resource testing process 10 completes the removing process after removing nodes 310, 316, 318. In some implementations, the above-described reducing and/or removal process occurs before, during, and/or after graph structure generation.

In some implementations, automated cloud computing resource testing process 10 performs 106 a constrained optimization process for the graph structure. For example, using automated cloud computing resource testing process 10, the configuration for the nodes of graph structure 208 is determined in such a way that compatibility constraints 202 are satisfied and, to the greatest extent possible, desired/target prevalence metrics 206 are achieved, where the closeness between actual and target distributions is quantified by an objective function O(S), where S is a schedule. For example, the prevalence metrics are encapsulated in the objective function such that optimizing under the objective function, optimizes the testing schedule to achieve, or nearly achieve, the prevalence metrics. Examples of the objective function include a mean-squared error (MSE) objective function, a squared error objective function, an absolute value of sum of errors objective function, etc. As will be discussed in greater detail below, automated cloud computing resource testing process 10 generates a testing schedule that meets compatibility constraints 202 while optimizing for prevalence metrics 206 using a constrained optimization process. A constrained optimization process (e.g., constrained optimization process 226) is a process for generating a list of cliques that satisfy the coverage constraints from graph structure 208 that meets compatibility constraints 202 while optimizing for prevalence metrics 206.

In some implementations, automated cloud computing resource testing process 10 generates in an initial list of cliques by performing a build-cliques algorithm or process. In one example, the build-cliques algorithm is a modified version of the Tomita algorithm (which is a variation of the Bron-Kerbosch algorithm that uses a pivoting policy to cut computational branches). In some implementations, automated cloud computing resource testing process 10 performs a build-cliques algorithm with the following parameters: a clique and/or a node, a common neighbor set (i.e., the set of neighbors for the given node or the set of common neighbors between the nodes in the given clique), a set of nodes to exclude, a list of cliques to exclude, a set of covered nodes, and the desired number of cliques. However, it will be appreciated that any parameters may be used within the scope of the present disclosure.

In one example, if the size of the clique is equal to the number of dimensions, the clique is provided. In some implementations, the build-cliques algorithm is stopped (i.e., stops providing cliques) when the desired number of cliques is provided. When processing common neighbors of clique nodes, automated cloud computing resource testing process 10 removes nodes in the exclude-node set and removes the neighbors of the node with the most neighbors in the common neighbors set (this describes the pivoting policy of the Tomita algorithm). In some implementations and for each of the remaining common neighbor nodes, automated cloud computing resource testing process 10 adds the neighbor node to the clique, updates the common neighbors set to only include the nodes that also neighbor the newly added neighbor node, and recurses. In one example, automated cloud computing resource testing process 10 prioritizes the nodes not in the covered set when processing each of the remaining common neighbor nodes.

For example and as shown in FIG. 5, suppose node is randomly chosen (i.e., (node 300)), the set of covered nodes is empty, and the desired number of cliques is one. In this example, automated cloud computing resource testing process 10 processes a node (e.g., node 300) and returns a clique (e.g., {node 300, node 306}). Automated cloud computing resource testing process 10 then processes the returned clique (e.g., {node 300, node 306}) to generate clique {node 300, node 306, node 312} which completes all cliques for node 300. Automated cloud computing resource testing process 10 then processes the next uncovered node (i.e., node 302) with nodes {node 300, node 306, node 312} listed as covered nodes. In this example, automated cloud computing resource testing process 10 processes a node (e.g., node 302) and adds the node to a clique (e.g., {node 302, node 314}). Automated cloud computing resource testing process 10 then processes the current clique (e.g., {node 302, node 314}) and the covered nodes (e.g., nodes 300, 306, 312) to generate clique {node 302, node 308, node 314} which completes all cliques for node 302 using node 308 instead of node 306, as node 306 is already covered. Automated cloud computing resource testing process 10 then processes the last remaining uncovered node (i.e., node 304) with nodes {nodes 300, 302, 306, 308, 312, 314} listed as covered nodes. In this example, automated cloud computing resource testing process 10 processes a node (e.g., node 304) and returns a clique (e.g., {node 304, node 308, node 314}) which completes all cliques for node 304. From this example, the list of cliques is [(node 300, node 306, node 312), (node 302, node 308, node 314), and (node 304, node 308, node 314)] which covers all nodes in graph structure 208. In this example, the list of cliques defines the coverage schedule for the nodes. In some implementations, automated cloud computing resource testing process 10 is given a number of nodes (n) and adds "n−(length of coverage schedule) cliques" to the coverage schedule, resulting in the initial testing schedule. In one example, automated cloud computing resource testing process 10 adds cliques that come from the coverage schedule. In another example, automated cloud computing resource testing process 10 adds cliques from anywhere in the graph structure.

In some implementations, the constrained optimization process includes simulated annealing optimization. For example, simulated annealing optimization (e.g., simulated annealing optimization 228) is an optimization technique inspired the annealing process in metallurgy, where a material is heated and then slowly cooled to remove defects and improve its structure. In optimization, simulated annealing determines an approximation of the global minimum of a function. Simulated annealing optimization 228 includes occasional increases in an objective function to "escape" a local minimum with the likelihood of such movements decreasing over time as the system being optimized "cools down". In some implementations, simulated annealing optimization 228 of automated cloud computing resource testing process 10 uses the build-cliques algorithm and modifies a given list of cliques by iteratively replacing a single clique in the list with another clique.

For example, simulated annealing optimization 228 iteratively modifies individual cliques in an initial testing schedule, $S_0$ to produce a new, more optimal schedule S. In one example, simulated annealing optimization 228 generates an initial testing schedule (i.e., a testing schedule generated as described above that satisfies compatibility constraints 202) and the coverage constraint (i.e., requirement that each node is covered by the testing schedule) which includes a predefined number ("n") of randomly selected cliques from graph structure 208. In some implementations, "n" or n is a predefined number of cliques to be included in the testing schedule. In some implementations, the testing schedule is a list of tuples with each tuple representing a relationship between cloud computing resources from the graph structure. Accordingly, automated cloud computing resource testing process 10 generates an initial testing schedule as a list of tuples (e.g., tuples 230, 232, 234, 236) where each tuple includes a combination of cloud computing resources to be tested. In one example, each clique in the list of cliques is sized equal to the number of dimensions. For instance, the tuple 230 is a clique with a size of three (i.e., three entries) corresponding to three dimensions in graph structure 208.

In some implementations, the prevalence metrics are encapsulated in an objective function. Automated cloud computing resource testing process 10 determines the "cost" of the generated testing schedule using the objective function and iteratively replaces a single tuple (e.g., tuple 230) from the list of tuples to maximize or minimize the objective function defined for prevalence metrics 206.

Referring again to the example of FIG. 5 and in some implementations, automated cloud computing resource testing process 10 iteratively modifies and/or replaces the list of cliques (e.g., for a specific amount of time and/or for a particular number of iterations). For example, automated cloud computing resource testing process 10 removes a clique from anywhere in the initial list of cliques [(node 300, node 306, node 312), (node 302, node 308, node 314), and (node 304, node 308, node 314)] or from a list of cliques added to the current list of cliques and determines whether the coverage constraint is broken (i.e., some node in graph structure 208 is not covered by the remaining list of cliques). If the coverage constraint is broken, automated cloud computing resource testing process 10 rebuilds the clique (using the build-cliques algorithm) with the set of uncovered nodes as the given clique and excluding the removed clique. The removed clique is replaced with the new clique provided by the rebuilding (as described above). If the coverage constraint is unbroken with the removal, a replacement clique is determined in one of several ways.

In one example, automated cloud computing resource testing process 10 determines the replacement clique (using the build-cliques algorithm) from a clique including a single, random node of graph structure 208, excluding the removed clique. In another example, automated cloud computing resource testing process 10 determines the replacement clique from a clique including all but one node of the nodes of the removed clique, excluding the removed clique. In another example, automated cloud computing resource testing process 10 determines the replacement clique from a clique including a single node of the removed clique, excluding the removed clique. In this manner, automated cloud computing resource testing process 10 iteratively modifies and/or replaces the cliques in the list of cliques for a predefined period of time and/or for a predefined number of iterations. For example, automated cloud computing resource testing process 10 iteratively modifies and/or replaces cliques within the list of cliques and tracks the most optimal list obtained and provides the most optimal list found (e.g., within the predefined period of time and/or the predefined number of iterations). In this manner, a "current" list of cliques is updated to the new list of cliques (i.e., the new list of cliques becomes the current list of cliques) if the new list of cliques is more optimal. However, if the new list of cliques is not more optimal, then it becomes the current list under some probability, that can vary throughout the execution of automated cloud computing resource testing process 10. In some implementations, simulated annealing optimization 228 minimizes the objective function. Alternatively and in some implementations, simulated annealing optimization 228 maximizes the objective function by taking a negation of the objective function (e.g., O(S)*−1).

In some implementations, the constrained optimization process includes branch and bound optimization. For example, a branch and bound optimization (e.g., branch and bound optimization 238) is an optimization technique that branches (i.e., systematically divides the problem into smaller subproblems until the subproblems are solvable directly); bounds (i.e., for each subproblem, determining a lower bound on the optimality (as determined by the objective function value) of the best solution that can be obtained); and prunes (i.e., removing subproblems whose bounds indicate that no solution, more optimal than the most optimal solution observed so far, can be found) the problem. In some implementations, branch and bound optimization 238 uses the build-cliques algorithm and branching steps that correspond to adding a clique to a partially assembled list of cliques while the length of which is less than a predefined limit. In some implementations, branch and bound optimization 238 minimizes the objective function. Alternatively and in some implementations, branch and bound optimization 238 maximizes the objective function by taking a negation of the objective function (e.g., O(S)*−1).

For instance and for a given schedule S, if O(S) is dimension-based (i.e., the weighted sum of mean-squared-errors between the target/actual prevalence metrics of dimension values in each dimension, where each dimension is a type of cloud computing resource), then for each dimension, the values of the actual and target prevalence metrics are multiplied by n (i.e., a predefined limit) to obtain the actual and target numbers of nodes for each dimension value in that dimension. Then, the actual number of nodes for the dimension value with the largest difference between target and actual numbers of nodes is incremented by 1. This is done n−|S| times. Then, for each dimension, the target and actual numbers of nodes of each dimension value are divided by n (normalized) to obtain the target prevalence metrics and updated actual prevalence metrics, from which the value of the objective function is calculated to get the lower bound of cost of a length-n schedule produced from S.

Similarly, if O(S) is relationship-based (i.e., the weighted sum of mean-squared-errors between the target/actual prevalence metrics for relationships (pairs of dimension values) in each pair of dimensions), then this is done with respect to the relationships for each pair of dimensions. If O(S) is combination-based (i.e., the mean-squared-error between the target/actual prevalence metrics of dimension value configurations (spanning all dimensions)), then this is done with respect to node configurations. Accordingly, the lower bound is calculated by iteratively and greedily determining the node configurations for the n−|S| additional nodes (which may not be valid node configurations), such that the value of the objective function is decreased by the largest possible amount or increased by the smallest possible amount in each iteration.

In some implementations, automated cloud computing resource testing process 10 branches on a list of node configurations (with a length less than number of nodes) by returning or generating a number of new schedules, where the number is at most a predefined branch factor, each of which is the given schedule with an extra clique. For example, if there are nodes not covered by a given list of node configurations, automated cloud computing resource testing process 10 loops through the uncovered nodes and, for each uncovered node, returns as many new lists of configurations as possible that include the given schedule and a clique that covers the uncovered node but stopping when a branch factor number of new lists of node configurations are returned. If there are no uncovered nodes, automated cloud computing resource testing process 10 returns at most a branch factor number of new schedules, each of which includes the given node configuration and an extra clique. For example, automated cloud computing resource testing process 10 loops through each node and, for each node, returns as many new lists of configurations as possible that include the given schedule and a clique that covers the node but stopping when a branch factor number of new lists of node configurations are returned. In some implementations, a branch factor number may not be defined. Accordingly and in such examples, there is no limit imposed on the number of new schedules/lists of cliques generated by each branching step.

Figure 6:
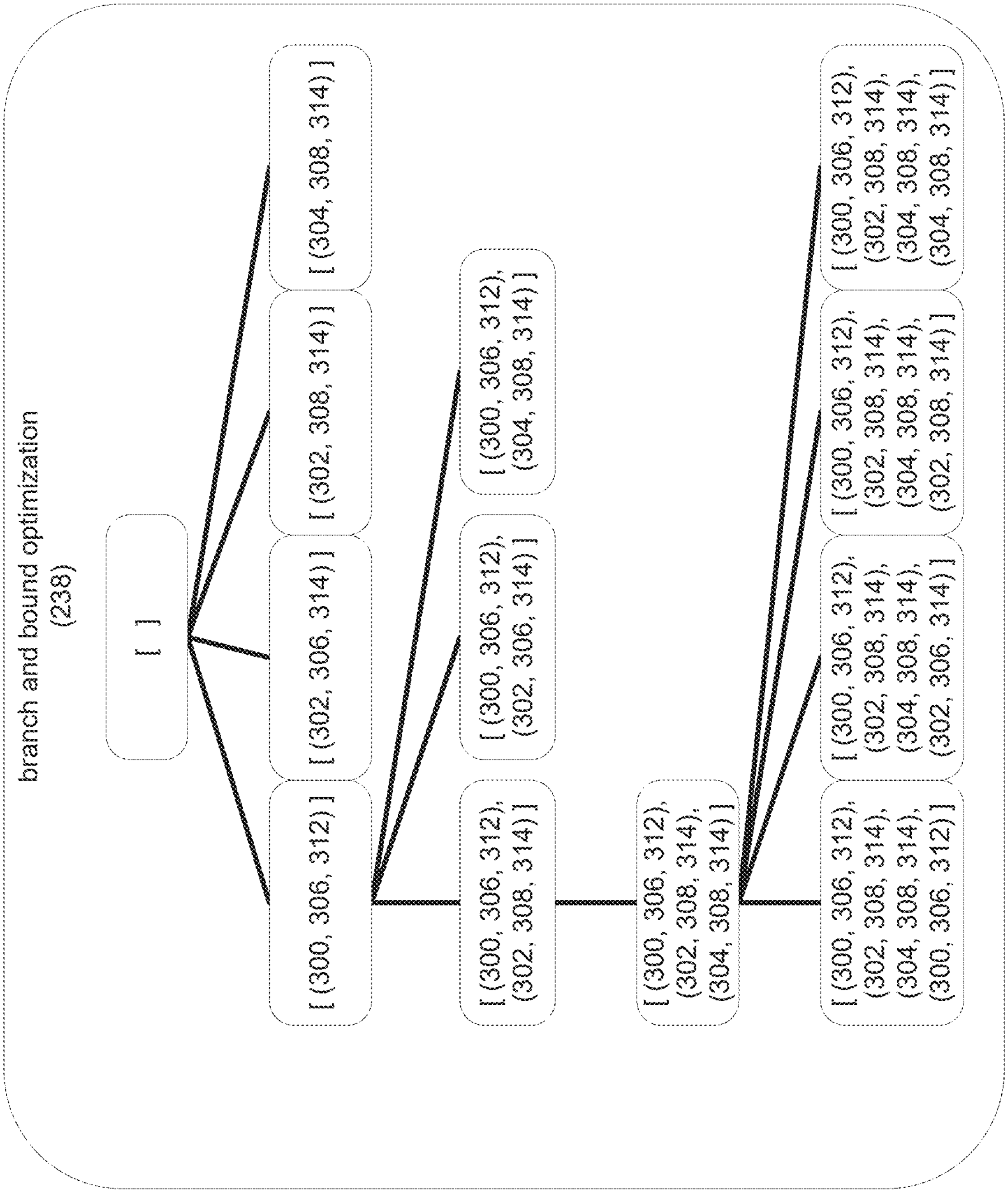
FIGS. 6-7 are diagrammatic views of branch and bound optimizations of a testing schedule according to an implementations of automated cloud computing resource testing process.

Referring also to FIGS. 5-6 and in some implementations, automated cloud computing resource testing process 10 uses branch and bound optimization 238 and the build-cliques algorithm to generate and optimize a testing schedule. For example, automated cloud computing resource testing process 10 branches on a testing schedule including one clique (e.g., [(node 300, node 306, node 312)]), identifies any uncovered nodes and, for each uncovered node (e.g., nodes 302, 308, 312, 314), automated cloud computing resource testing process 10 provides at most a branch factor number of lists of cliques that include the given schedule (e.g., [(node 300, node 306, node 312)]) and a clique that includes the uncovered node (e.g., [(node 300, node 306, node 312), (node 302, node 308, node 314)]; [(node 300, node 306, node 312), (node 302, node 306, node 314)]; and [(node 300, node 306, node 312), (node 304, node 308, node 314)]). Automated cloud computing resource testing process 10 then continues branching on partial schedules (i.e., schedules with less than the predefined number of cliques) and evaluating complete schedules (e.g., with length equal to the predefined number of cliques), stopping after a predefined time limit, a predefined number of iterations, and/or until all branch steps have been completed and/or the tree of lists of cliques has been fully explored.

Figure 7:
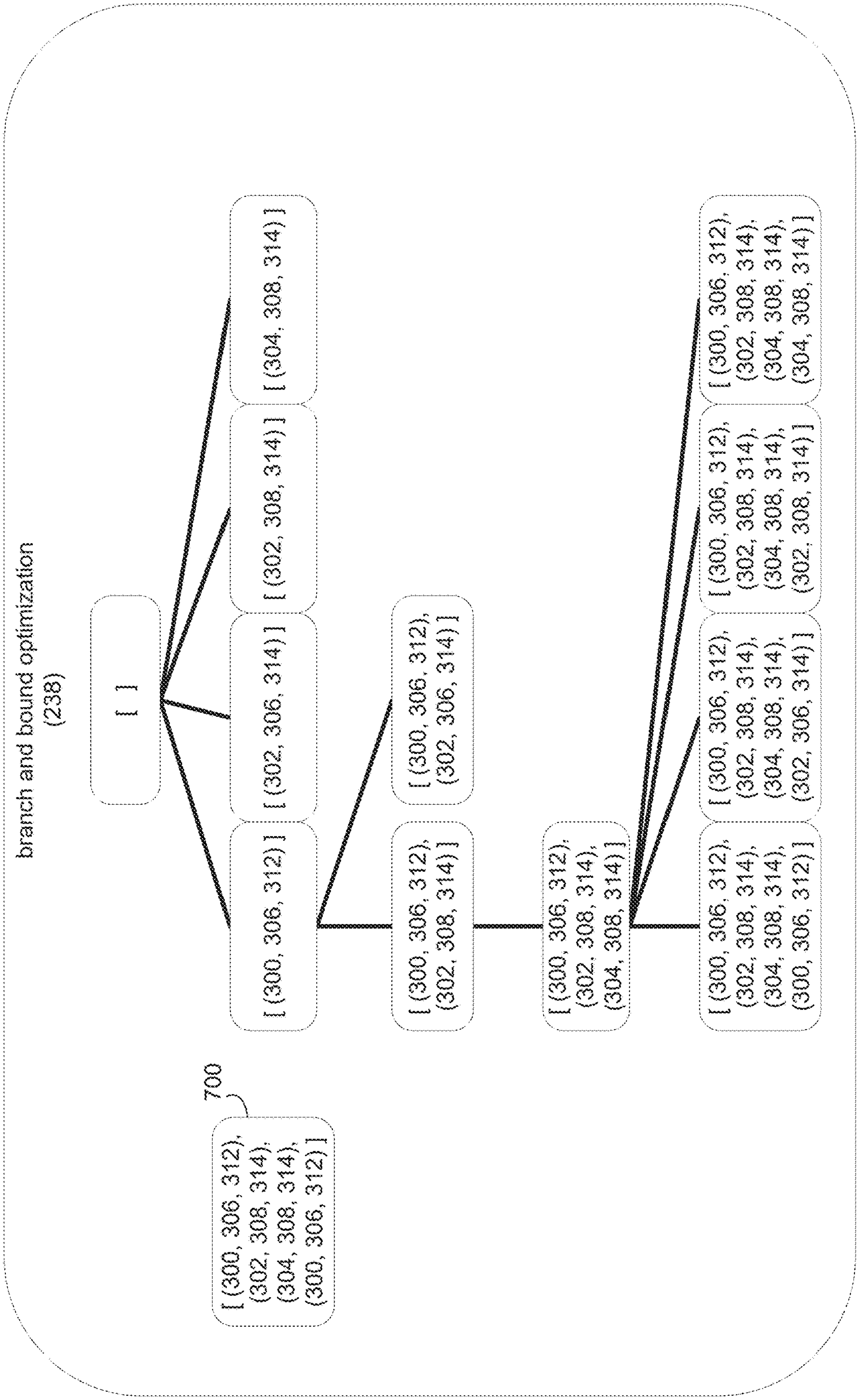

In another example, given a testing schedule S (where |S|<n) and a branch factor b, branch and bound optimization 238 returns b new schedules, each of which is S with an additional clique that preserves the compatibility constraints when followed by the last n−|S|−1 cliques from $S_0$ (i.e., the initial testing schedule). Accordingly, automated cloud computing resource testing process 10 uses branch and bound optimization 238 to optimize a testing schedule. Referring also to FIGS. 5 and 7 and in some implementations, automated cloud computing resource testing process 10 uses branch and bound optimization 238 and the build-cliques algorithm to generate and optimize a testing schedule relative to an initial list of cliques (e.g., initial schedule 700). For example, automated cloud computing resource testing process 10 branches on a testing schedule including one clique (e.g., [(node 300, node 306, node 312)]) to determine a clique to add (e.g., a second clique in this example). Automated cloud computing resource testing process 10 determines the next clique to add by processing cliques from a parent list of cliques (e.g., [(node 300, node 306, node 312)]) and the last n−|S|−1 cliques from the initial clique list (e.g., initial schedule 700) except the second clique (e.g., by processing cliques [(node 304, node 308, node 314) and (node 300, 306, 312)]). From these cliques, automated cloud computing resource testing process 10 identifies any uncovered nodes and performs the build-cliques algorithm to generate at most a branch factor number of cliques. In this example, automated cloud computing resource testing process 10 identifies any uncovered nodes (e.g., node 302) and performs the build-cliques algorithm from node 302 to generate, in this example, two cliques (e.g., [(node 302, node 306, node 314) and (node 302, 308, 314)]) as the branch factor is at least four in this example. Accordingly, automated cloud computing resource testing process 10 generates two branches (e.g., [(node 300, node 306, node 312), (node 302, 308, 314)]; and [(node 300, node 306, node 312), (node 302, 306, 314)]). In some implementations where there are no uncovered nodes, automated cloud computing resource testing process 10 loops through each node and, for each node, returns as many new lists of configurations as possible that include the given schedule and a clique that covers the node but stopping when a branch factor number of new lists of node configurations are returned.

In some implementations, automated cloud computing resource testing process 10 then branches on partial schedules (i.e., schedules with less than the predefined number of cliques) and evaluates complete schedules (e.g., with length equal to the predefined number of cliques), stopping after a predefined time limit, a predefined number of iterations, and/or until all branch steps have been completed and/or the tree of lists of cliques has been fully explored. When a complete list of cliques is generated (i.e., with a length equal to n), automated cloud computing resource testing process 10 compares the list of cliques generated to the most optimal list of cliques observed so far, to determine whether the generated list of cliques is more optimal than the most optimal list of cliques observed so far. In some implementations, automated cloud computing resource testing process 10 continually compares lists of cliques from branch and bound optimization 238 to the most optimal list of cliques observed so far to identify a most optimal list of cliques relative to the lists of cliques generated by automated cloud computing resource testing process 10. While the examples of FIGS. 6-7 show branches from a "tree" of cliques, it will be appreciated that branch and bound optimization can be performed in other formats within the scope of the present disclosure. Additionally, while examples of branching steps and orders for evaluating resulting lists of cliques have been provided, it will be appreciated that various branching steps and/or various orders of evaluating resulting lists of cliques may be performed within the scope of the present disclosure.

In some implementations, branch and bound optimization 238 includes optionally completing a partial schedule (i.e., a schedule with less than the predefined number of cliques) by appending cliques to the partial schedule. In one example and as described above, the appended cliques are iteratively and greedily chosen such that in each iteration, the append clique covers the most uncovered nodes. In this example, if there are no uncovered nodes, then the appended cliques are randomly sampled from the coverage schedule. In another example and as described above, the appended cliques are just the last $n-|S|-1$ cliques from the initial schedule. In some implementations, this approach does not affect the branching/lower bound computation, but rather finds complete (and potentially more optimal) solutions more quickly than from the branching as described above. This approach allows automated cloud computing resource testing process 10 to find more potentially optimal schedules earlier in the process.

In some implementations, automated cloud computing resource testing process 10 generates 108 a testing schedule for the cloud computing resources using the graph structure and the constrained optimization process. For example and as discussed above, automated cloud computing resource testing process 10 generates 108 a testing schedule (e.g., testing schedule 240) using graph structure 208 and constrained optimization process 226 (e.g., simulated annealing optimization 228, branch and bound optimization 238, etc.) as a list of tuples (e.g., tuples 230, 232, 234, 236) that cover the cloud computing resources represented in graph structure 208. In some implementations, automated cloud computing resource testing process 10 generates 108 testing schedule 240 as a plurality of cloud computing resource configurations (e.g., cloud computing resource configurations 242, 244, 246) executed on a plurality of testing computing devices (e.g., servers 248, 250, 252). For example, cloud computing resource configurations 242, 244, 246 includes individual tuples (e.g., tuples 230, 232, 234, 236) and/or combinations of tuples. In this manner, cloud computing resource configurations references specific tuples or combination of tuples that are assigned to a testing computing device. Accordingly, with an agent to test, automated cloud computing resource testing process 10 is able to execute testing schedule 240 on cloud computing resource configurations 242, 244, 246 using various testing computing devices (e.g., servers 248, 250, 252). In another example, automated cloud computing resource testing process 10 is able to execute testing schedule 240 on cloud computing resource configurations 242, 244, 246 for particular cloud computing resources using various testing computing devices (e.g., servers 248, 250, 252).

In some implementations, generating 108 the testing schedule for the cloud computing resources includes provisioning 110 a maximum number of cloud computing resources for performing testing on the cloud computing resources. For example, the resulting testing schedule S (e.g., testing schedule 240) includes n cloud computing resource configurations, each containing a virtual machine resource type. If testing schedule 240 is executed in its current form, then n virtual machine resources will be used for testing. However, in practice, testing computing devices can be "packed" or provisioned with multiple virtual machines. In some implementations, automated cloud computing resource testing process 10 provisions 110 a maximum number of virtual machine resources as possible to perform the most amount of testing possible. Hence, each testing configuration $s \in S$ can be duplicated $w_s-1$ times, where $w_s$ is the maximum number of virtual machine resources (of the virtual machine type specified in s) that can be run on the testing computing device (with the hardware resource model specified in s). In one example, these $w_s$ tests are executed on the same testing computing resource (e.g., server 248). While an example of virtual machine resources has been described, it will be appreciated that automated cloud computing resource testing process 10 can provision 110 a maximum number of various types of cloud computing resources within the scope of the present disclosure.

In some implementations, automated cloud computing resource testing process 10 executes 112 the testing schedule for the cloud computing resources on the cloud computing environment. For example and as shown in FIG. 2, using testing schedule 240, automated cloud computing resource testing process 10 assigns particular cloud computing resource configurations (e.g., cloud computing resource configurations 242, 244, 246) to a plurality of testing computing devices (e.g., servers 248, 250, 252) within cloud computing environment 200. As discussed above, each testing computing device includes various cloud computing resource configurations. Accordingly, each testing computing device executes 112 tests on the assigned cloud computing resource configurations. In some implementations, a testing computing device executes 112 tests for multiple cloud computing resource configurations. As discussed above, the tests executed on the cloud computing resource configurations are tests for an agent to be deployed by cloud computing environment 200 for the particular cloud computing resource configuration. In one example, automated cloud computing resource testing process 10 performs testing on agents deployed in the testing computing devices and/or on cloud computing resources of the testing computing devices.

In some implementations, automated cloud computing resource testing process 10 processes 114 a result from the executing of the testing schedule and performs 116 a remedial action concerning a cloud computing resource within the cloud computing environment based upon, at least in part, the result. For example, after executing the tests of testing schedule 240, automated cloud computing resource testing process 10 processes a result (e.g., result 254) for the test. In response to processing a result for a test, automated cloud computing resource testing process 10 performs 116 a remedial action (e.g., remedial action 256). In one example, remedial action 256 includes an alert concerning a test or an agent of cloud computing environment 200. In another example, remedial action 256 blocks or prevents particular agents from being deployed on specific cloud computing resource configurations. In this manner, automated cloud computing resource testing process 10 is able to efficiently and automatically generate and execute a testing schedule across various testing computing devices without enumerating all possible cloud computing testing configurations. While examples have been given of testing cloud computing resources, it will be appreciated that any reference to a cloud computing resource is for example purposes only and that hardware resources, virtual resources, operating system resources, workloads, hypervisor resources, other cloud-computing resources, and other more generic, non-cloud computing versions of these resources are within the scope of the present disclosure. As such, automated cloud computing resource testing process 10 is able to generate testing schedules for non-cloud computing resources in a similar manner to cloud computing resources.

Figure 8:
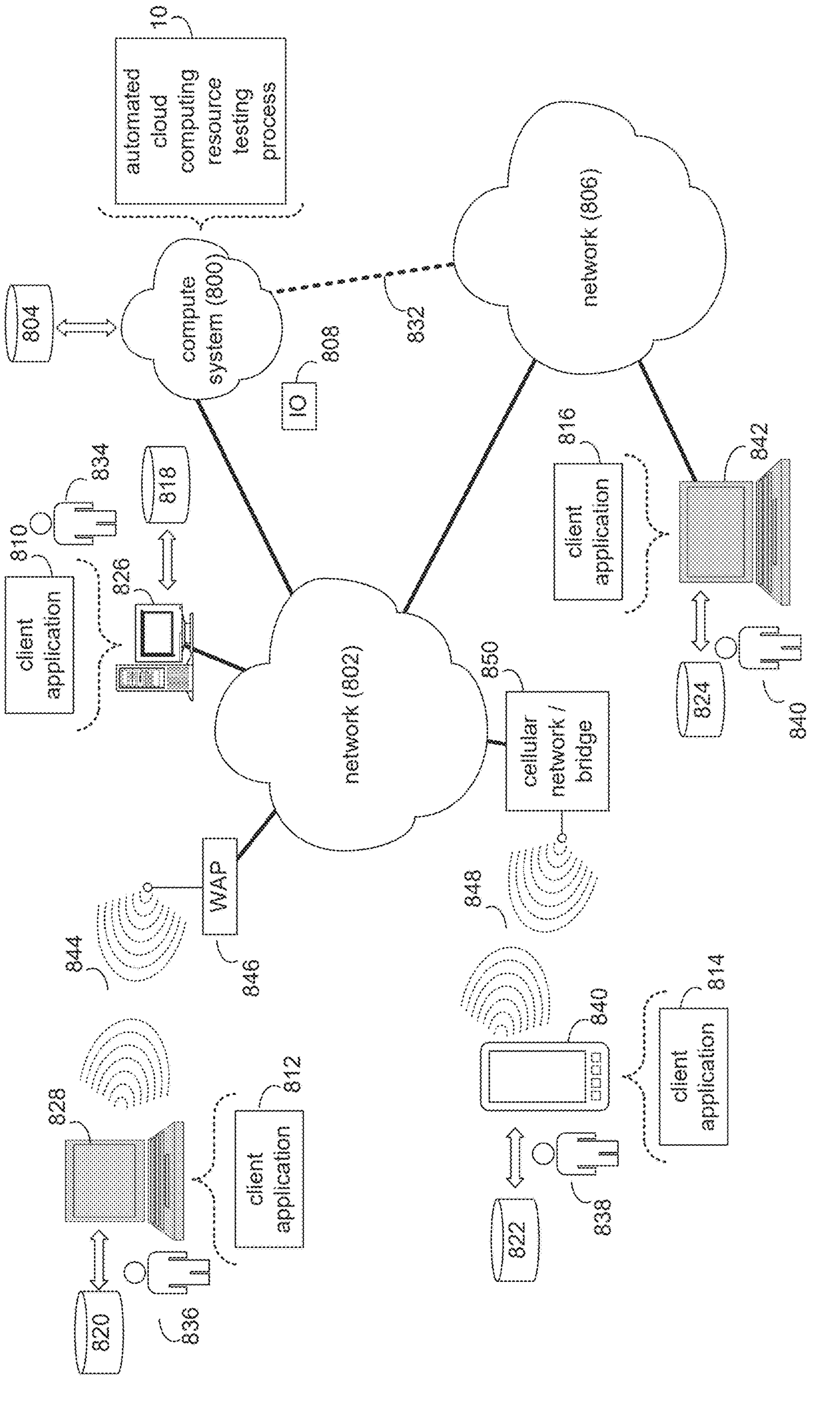
FIG. 8 is a diagrammatic view of computer system and the automated cloud computing resource testing process coupled to a distributed computing network.

System Overview:

Referring to FIG. 8, an automated cloud computing resource testing process 10 is shown to reside on and is executed by compute system 800, which is connected to network 802 (e.g., the Internet or a local area network). Examples of compute system 800 include: a Network Attached Storage (NAS) system, a Storage Area Network (SAN), a personal computer with a memory system, a server computer with a memory system, and a cloud-based device with a memory system. A SAN includes one or more of a personal computer, a server computer, a series of server computers, a minicomputer, a mainframe computer, a RAID device, and a NAS system.

The various components of compute system 800 execute one or more operating systems, examples of which include: Microsoft® Windows®; Mac® OS X®; Red Hat® Linux®, Windows® Mobile, Chrome OS, Blackberry OS, Fire OS, or a custom operating system (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of automated cloud computing resource testing process 10, which are stored on storage device 804 included within compute system 800, are executed by one or more processors (not shown) and one or more memory architectures (not shown) included within compute system 800. Storage device 804 may include: a hard disk drive; an optical drive; a RAID device; a random-access memory (RAM); a read-only memory (ROM); and all forms of flash memory storage devices. Additionally or alternatively, some portions of the instruction sets and subroutines of automated cloud computing resource testing process 10 are stored on storage devices (and/or executed by processors and memory architectures) that are external to compute system 800.

In some implementations, network 802 is connected to one or more secondary networks (e.g., network 806), examples of which include: a local area network; a wide area network; or an intranet.

Various input/output (IO) requests (e.g., IO request 808) are sent from client applications 810, 812, 814, 816 to compute system 800. Examples of IO request 808 include data write requests (e.g., a request that content be written to compute system 800) and data read requests (e.g., a request that content be read from compute system 800).

The instruction sets and subroutines of client applications 810, 812, 814, 816, which may be stored on storage devices 818, 820, 822, 824 (respectively) coupled to client electronic devices 826, 828, 380, 332 (respectively), may be executed by one or more processors (not shown) and one or more memory architectures (not shown) incorporated into client electronic devices 826, 828, 830, 832 (respectively). Storage devices 818, 820, 822, 824 may include: hard disk drives; tape drives; optical drives; RAID devices; random access memories (RAM); read-only memories (ROM), and all forms of flash memory storage devices. Examples of client electronic devices 826, 828, 380, 332 include personal computer 826, laptop computer 828, smartphone 380, laptop computer 332, a server (not shown), a data-enabled, and a dedicated network device (not shown). Client electronic devices 826, 828, 830, 832 each execute an operating system.

Users 834, 836, 838, 840 may access compute system 800 directly through network 802 or through secondary network 806. Further, compute system 800 may be connected to network 802 through secondary network 806, as illustrated with link line 832.

The various client electronic devices may be directly or indirectly coupled to network 802 (or network 806). For example, personal computer 826 is shown directly coupled to network 802 via a hardwired network connection. Further, laptop computer 832 is shown directly coupled to network 806 via a hardwired network connection. Laptop computer 828 is shown wirelessly coupled to network 802 via wireless communication channel 844 established between laptop computer 828 and wireless access point (e.g., WAP) 846, which is shown directly coupled to network 802. WAP 846 may be, for example, an IEEE 802.11a, 802.11b, 802.11g, 802.11n, Wi-Fi®, and/or Bluetooth® device that is capable of establishing a wireless communication channel 844 between laptop computer 828 and WAP 846. Smartphone 830 is shown wirelessly coupled to network 802 via wireless communication channel 848 established between smartphone 830 and cellular network/bridge 850, which is shown directly coupled to network 802.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be used. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, not at all, or in any combination with any other flowcharts depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:

processing a plurality of compatibility constraints for a cloud computing environment;

processing a plurality of prevalence metrics for the cloud computing environment;

generating a graph structure mapping compatibility relationships between cloud computing resources based upon, at least in part, the plurality of compatibility constraints;

defining a constrained optimization process for the graph structure;

generating a testing schedule for the cloud computing resources using the graph structure and the constrained optimization process, the testing schedule comprising a plurality of cloud computing resource configurations in the cloud computing environment; and executing the testing schedule of the plurality of cloud computing resource configurations in the cloud computing environment.

2. The computer-implemented method of claim 1, wherein the cloud computing resources include one or more of:

hardware resources;

virtual machine resources; and operating system resources.

3. The computer-implemented method of claim 1, wherein the plurality of compatibility constraints concern the compatibility between hardware resources, virtual machine resources, and/or operating system resources within the cloud computing environment.

4. The computer-implemented method of claim 1, wherein the constrained optimization process includes simulated annealing optimization.

5. The computer-implemented method of claim 1, wherein the constrained optimization process includes branch and bound optimization.

6. The computer-implemented method of claim 1, wherein generating the testing schedule for the cloud computing resources includes provisioning a maximum number of cloud computing resources for performing testing on the cloud computing resources.

7. A computing system comprising:

a memory; and a processor operatively coupled to the memory, the processor configured to;

process a plurality of compatibility constraints for a cloud computing environment, process a plurality of prevalence metrics for the cloud computing environment, generate a graph structure mapping compatibility relationships between cloud computing resources based upon, at least in part, the plurality of compatibility constraints, define a constrained optimization process for the graph structure, wherein the constrained optimization process includes simulated annealing optimization, generate a testing schedule for the cloud computing resources using the graph structure and the constrained optimization process, the testing schedule comprising a plurality of cloud computing resource configurations in the cloud computing environment; and execute the testing schedule of the plurality of cloud computing resource configurations in the cloud computing environment.

8. The computing system of claim 7, wherein the cloud computing resources include one or more of:

hardware resources;

virtual machine resources; and operating system resources.

9. The computing system of claim 8, wherein the plurality of compatibility constraints concern the compatibility between hardware resources, virtual machine resources, and/or operating system resources within the cloud computing environment.

10. The computing system of claim 7, wherein generating the testing schedule for the cloud computing resources includes provisioning a maximum number of cloud computing resources for performing testing on the cloud computing resources.

11. The computing system of claim 7, wherein the testing schedule includes a list of tuples with each tuple representing a relationship between cloud computing resources from the graph structure.

12. The computing system of claim 7, wherein the processor is further configured to:

process a result from executing of the testing schedule; and perform a remedial action concerning a cloud computing resource within the cloud computing environment based upon, at least in part, the result.

13. A computer program product comprising a non-transitory computer readable medium having a plurality of instructions stored thereon which, when executed by a processor, cause the processor to:

process a plurality of compatibility constraints for a cloud computing environment;

process a plurality of prevalence metrics for the cloud computing environment;

generate a graph structure mapping compatibility relationships between cloud computing resources based upon, at least in part, the plurality of compatibility constraints;

define a constrained optimization process for the graph structure, wherein the constrained optimization process includes branch and bound optimization;

generate a testing schedule for the cloud computing resources using the graph structure and the constrained optimization process, the testing schedule comprising a plurality of cloud computing resource configurations in the cloud computing environment; and execute the testing schedule of the plurality of cloud computing resource configurations in the cloud computing environment.

14. The computer program product of claim 13, wherein the cloud computing resources include one or more of:

hardware resources;

virtual machine resources; and operating system resources.

15. The computer program product of claim 14, wherein the plurality of compatibility constraints concern the compatibility between hardware resources, virtual machine resources, and/or operating system resources within the cloud computing environment.

16. The computer program product of claim 14, wherein to generate the testing schedule for the cloud computing resources the processor is to provision a maximum number of cloud computing resources for performing testing on the cloud computing resources.

17. The computer program product of claim 13, wherein the processor is further to:

process a result from executing of the testing schedule; and perform a remedial action concerning a cloud computing resource within the cloud computing environment based upon, at least in part, the result.

* * * * *